United States Patent
Avadhanam et al.

(10) Patent No.: US 6,714,938 B1
(45) Date of Patent: Mar. 30, 2004

(54) QUERY PLANNING USING A MAXDIFF HISTOGRAM

(75) Inventors: Srikanth R. Avadhanam, Redmond, WA (US); Nigel R. Ellis, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 593 days.

(21) Appl. No.: 09/652,942

(22) Filed: Aug. 31, 2000

(51) Int. Cl.[7] .............................................. G06F 17/30
(52) U.S. Cl. .............................. 707/102; 707/1; 707/2; 707/3
(58) Field of Search ................................. 707/1–3, 102

(56) References Cited

U.S. PATENT DOCUMENTS

| | | | | |
|---|---|---|---|---|
| 5,870,752 A | * | 2/1999 | Gibbons et al. | 707/102 |
| 6,012,054 A | * | 1/2000 | Seputis | 707/3 |
| 6,278,989 B1 | * | 8/2001 | Chaudhuri et al. | 707/2 |
| 6,311,181 B1 | * | 10/2001 | Lee et al. | 707/5 |
| 6,353,826 B1 | * | 3/2002 | Seputis | 707/5 |
| 6,353,832 B1 | * | 3/2002 | Acharya et al. | 707/104.1 |
| 6,460,045 B1 | * | 10/2002 | Aboulnaga et al. | 707/102 |
| 6,477,523 B1 | * | 11/2002 | Chiang | 707/2 |
| 6,507,840 B1 | * | 1/2003 | Ioannidis et al. | 707/4 |

* cited by examiner

Primary Examiner—Greta Robinson
Assistant Examiner—Debbie M. Le
(74) Attorney, Agent, or Firm—Woodcock Washburn LLP

(57) ABSTRACT

Systems and methods create and maintain a maxdiff histogram for use in determining query costs. One aspect of the system is a data structure that provides fields that can be used to accurately represent a distribution of data regardless of the uniformity or lack thereof of the data. The fields of the data structure represent buckets in the histogram. The fields include a range_Hi_Key field indicating the upper bound for values represented by the bucket. The range_Hi_Key field is also the most frequently occurring value in the bucket. In addition, the fields include a cardEQ field representing the count of the most frequently occurring value, a cardLT field, which is the count of the values in the bucket that are less than the range_Hi_Key field, a LTDistinct field, which is a count of the number of distinct values represented by the bucket, and an LTDensity field, which is an average count for each of the attribute values in the bucket that are not the range_Hi_Key value. A further aspect is a method that creates and maintains the maxdiff histogram data structure. The method starts by creating a list of unused buckets. An input stream of attribute values is sorted and the following acts are performed for each value. If the new value is the same as the previous value, the cardEQ field is incremented. If not, the method checks to see if the histogram is full. If a bucket is available, it is allocated and the bucket fields are initialized. If a bucket is not available, the two buckets that have the least variance between them are merged into one bucket, and the freed bucket is made available for the newly read input value. Whenever a new bucket is created or altered, the variance between the bucket and its neighbors is recalculated.

17 Claims, 6 Drawing Sheets

QUERY PLANNING USING A MAXDIFF HISTOGRAM

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2000, Microsoft, Inc.

FIELD

The present invention pertains generally to computer-implemented databases, and more particularly to generating query plans for such databases.

BACKGROUND

Many computer software applications use database management systems (DBMS) to provide for persistent storage of data required by the applications. Database management systems provide interfaces for the storage and retrieval of the data. As the storage capacity of persistent storage units such as disks increase, applications have taken advantage of the increased capacity by using the DBMS to manage ever-increasing amounts of data.

As the volume of data increases, it becomes important for the DBMS to optimize access to the data. Accesses to the data typically take the form of a query, which returns a results set of data that meet the criteria set forth in the query. One technique used by many DBMS systems is to provide a query optimizer that analyzes query conditions and the organization of the data and determines an optimal method of retrieving the data.

In order for such query planning to be successful, the query optimizer must have access to accurate information regarding the distribution of data values that are relevant to the query. In order to obtain such distribution data, previous systems have used two mechanisms, random sampling and histograms.

In random sampling, randomly selected sections of the database are sampled, and the distribution of data values obtained in the samples is used to extrapolate the distribution of values for the database as a whole. Random sampling has the advantage that the entire database is not scanned, thereby providing performance benefits. However, random sampling can lead to inaccurate estimates of the distribution of data values in the database. This is because indexing mechanisms used to improve retrieval of result sets of queries tend to cluster like values together in the same section of the database. Thus, random sampling will tend to either overestimate the distribution of frequently occurring values while missing outlying values, or will overestimate outlying values while missing frequently occurring values.

Histograms provide another way of tracking and estimating the distribution of data in a database. The attributes of interest are selected, and the database is scanned to create a histogram representing the distribution of values for the attribute. Many systems use what is referred to as an equi-depth histogram. A disadvantage of the equi-depth histogram is that it assumes a uniform distribution of values for the attribute. This is often not the case. For example, consider an attribute comprising the age of an employee. Many of the values will be within the range of 25–65, with some outlying values above and below this range. Such a distribution is clearly not uniform, and will be poorly represented by an equi-depth histogram.

In either case, the distribution data used by the query optimizer to determine optimal plans for retrieving the data will be flawed, resulting in poorly executed queries. Thus there is a need for a system that provides an accurate representation of the distribution of attribute values in a database. The system should maintain accuracy without consuming large amounts of memory or other computing resources.

SUMMARY

The above-mentioned shortcomings, disadvantages and problems are addressed by the present invention, which will be understood by reading and studying the following specification.

The systems and methods described herein create and maintain a maxdiff histogram for use in determining query costs. One aspect of the system is a data structure that provides fields that can be used to accurately represent a distribution of data regardless of the uniformity or lack thereof of the data. The fields of the data structure represent buckets in the histogram. The fields include a range_Hi_ Key field indicating the upper bound for values represented by the bucket. The range_Hi_Key field is also the most frequently occurring value in the bucket. In addition, the fields include a cardEQ field representing the count of the most frequently occurring value, a cardLT field, which is the count of the values in the bucket that are less than the range_Hi_Key field, a LTDistinct field, which is a count of the number of distinct values represented by the bucket, and an LTDensity field, which is an average count for each of the attribute values in the bucket that are not the range_Hi_ Key value.

A further aspect is a method that creates and maintains the maxdiff histogram data structure. The method starts by creating a list of unused buckets. An input stream of attribute values is sorted and the following acts are performed for each value. If the new value is the same as the previous value, the cardEQ field is incremented. If not, the method checks to see if the histogram is full. If a bucket is available, it is allocated and the bucket fields are initialized. If a bucket is not available, the two buckets that have the least variance between them are merged into one bucket, and the freed bucket is made available for the newly read input value. Whenever a new bucket is created or altered, the variance between the bucket and its neighbors is recalculated.

A still further aspect is that a system comprises a database management system (DBMS) having a query optimizer that includes a costing component and a selectivity estimator. The DBMS is operative to create a maxdiff histogram for use by the costing component and the selectivity estimator.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

In addition, examples provided below will sometimes refer to a series of attribute value and counts of the form X(n). In these examples, the "X" represents the attribute value, and "n" represents the count of the number of attributes having that value.

The detailed description is divided into multiple sections. In the first section, the hardware and the operating environment in conjunction with which embodiments of the invention may be practiced are described. In the second section, an exemplary data structure for representing a maxdiff histogram according to an embodiment of the invention is presented. In the third section, a system level overview of the invention is presented. In the fourth section, methods of an exemplary embodiment of the invention are provided. Finally, in the fifth section, a conclusion of the detailed description is provided.

Hardware and Operating Environment

Figure 1:
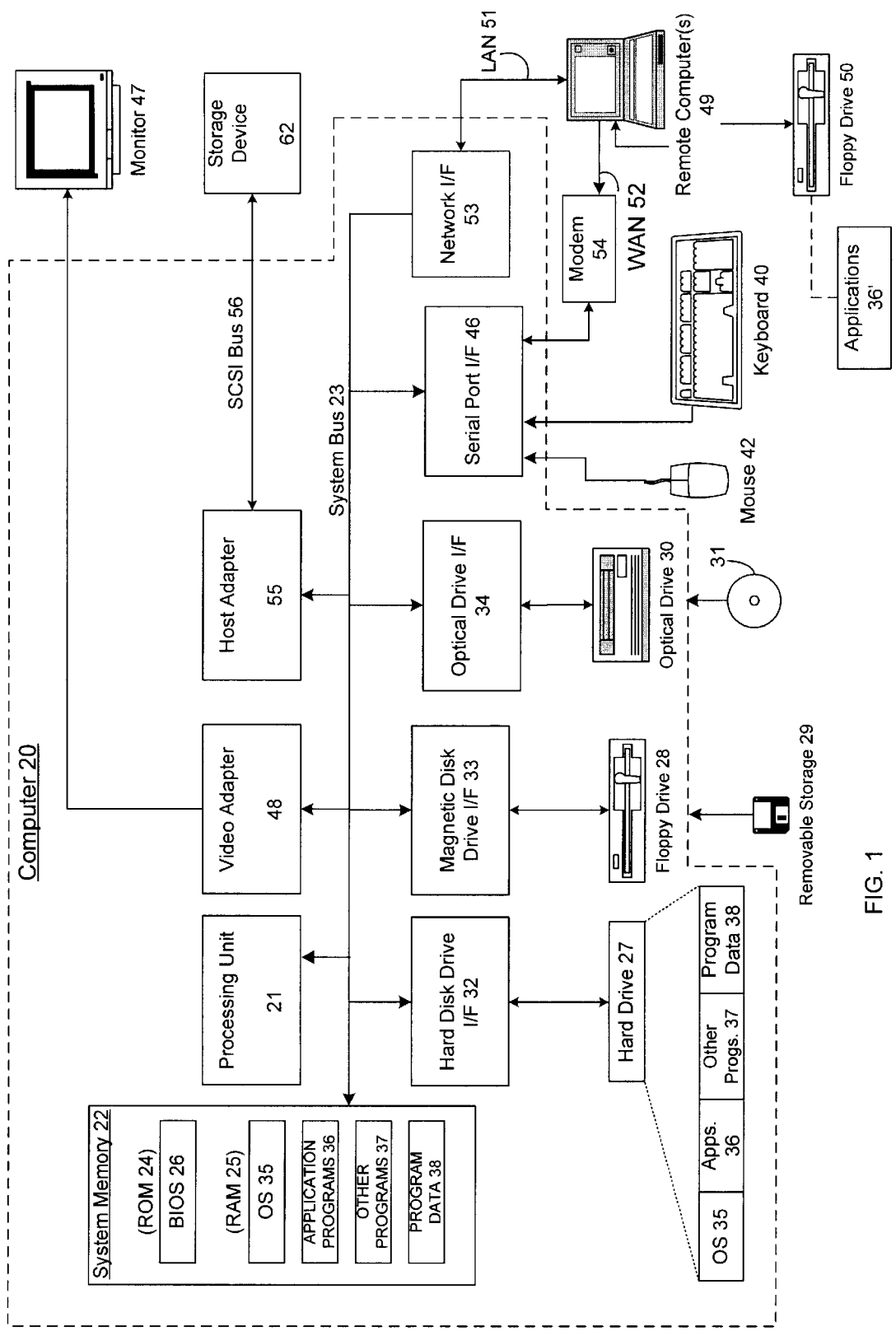
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Exemplary Maxdiff Histogram Data Structure

Figure 2:
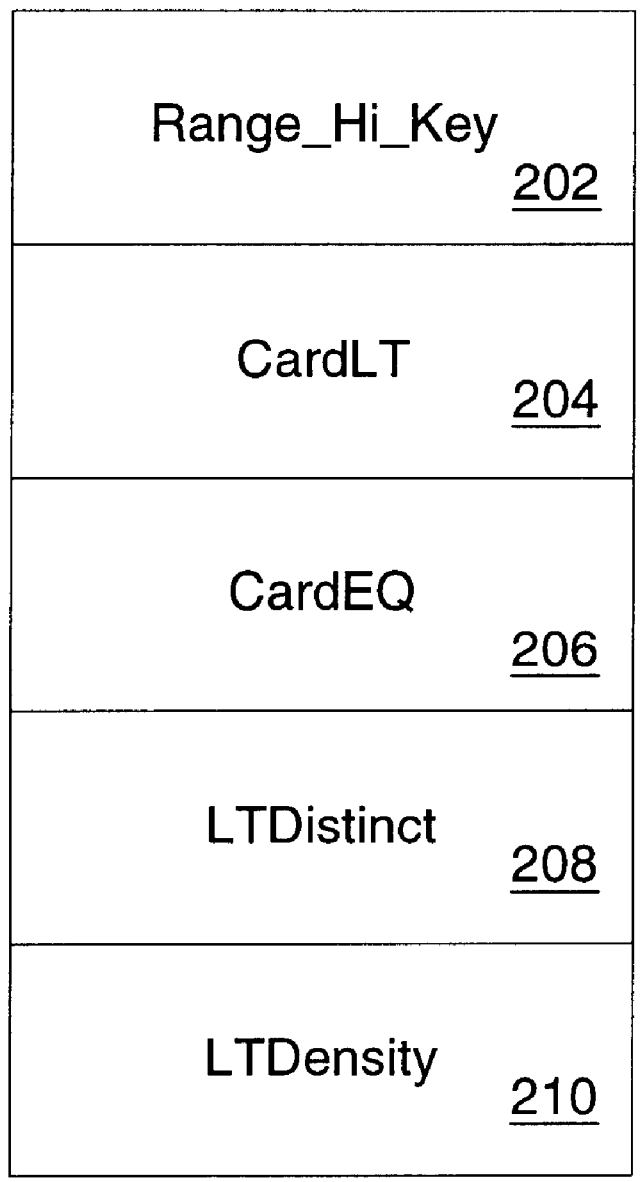
FIG. 2 is a diagram illustrating an exemplary data structure maintained in varying embodiments of the invention.

An exemplary data structure maintained by the systems and methods of varying embodiments of the invention is illustrated in FIG. 2. The data structure shown represents one bucket of a histogram comprising multiple buckets. In one embodiment of the invention, the multiple buckets are maintained in ascending attribute value order as a doubly linked list of buckets. However, the invention is not limited to ascending order, nor is the invention limited to maintaining the buckets as a doubly linked list. In alternative embodiments of the invention, the list can be maintained in descending order, or in no specific order. In addition, the systems, methods and data structures can be adapted to any suitable number of buckets in the list. In one embodiment of the invention, 200 buckets are provided, however the invention is not limited to any particular number of buckets. Furthermore, the multiple buckets can be maintained in a singly linked list, in an array, or in any other mechanism known in the art for storing a plurality of associated data structures. In the exemplary embodiment, the bucket data structure includes a range_Hi_Key field 202, a cardLT field 204, a cardEQ field 206, an LTdistinct field 208, and an LTdensity field 210.

Range_Hi_Key field 202 defines the upper bound of attribute values included in the bucket. In one embodiment of the invention, buckets are maintained in ascending order, so the lower bound on the attribute values for the bucket is implied as being greater than the upper bound of the previous bucket. However, in alternative embodiments of the invention, a lower bound field (not shown) defines the lower bound for attribute values in the bucket, with the upper bound implied as being less than the lower bound in the succeeding bucket. In a further alternative embodiment, fields representing both the lower and the upper bound attribute values are present in the data structure.

CardEQ field 206 is the upper bound for the bucket, and represents the most frequent value for the bucket. Further details on the method for calculating cardEQ field 206 will be presented in the sections that follow.

CardLT field 204 is a value indicating of the number of attribute values represented in the bucket (i.e. that are in the range defined by the bucket) that are less than the cardEQ field value 206 but greater than the lower bound value for the bucket. For example, if the bucket represents attribute values 2(1), 3(4), 4(2), and 5(10), card EQ will be 5, and cardLT will be 7(calculated from the counts 1+4+2).

LTdistinct field 208 is a count of the number of distinct attribute values represented in the bucket that are less than the upper bound of the bucket (range_Hi_Key). In the example above, LTdistinct will equal 3 (representing the attribute values 2,3 and 4).

LTdensity field 210 is the average attribute value for those attribute values in the bucket that are less than the cardEQ field 206. The average represents the sum of the count of each attribute value represented in the bucket that are less than cardEQ, and divided by the number of distinct attribute values in the bucket that are less than cardEQ. In the example provided, LTdensity is:

$$\frac{1+4+2}{1+1+1}$$

The concepts described in this section, including determining the fields 202–210 will be described in further detail in the sections that follow.

System Level Overview

Figure 3:
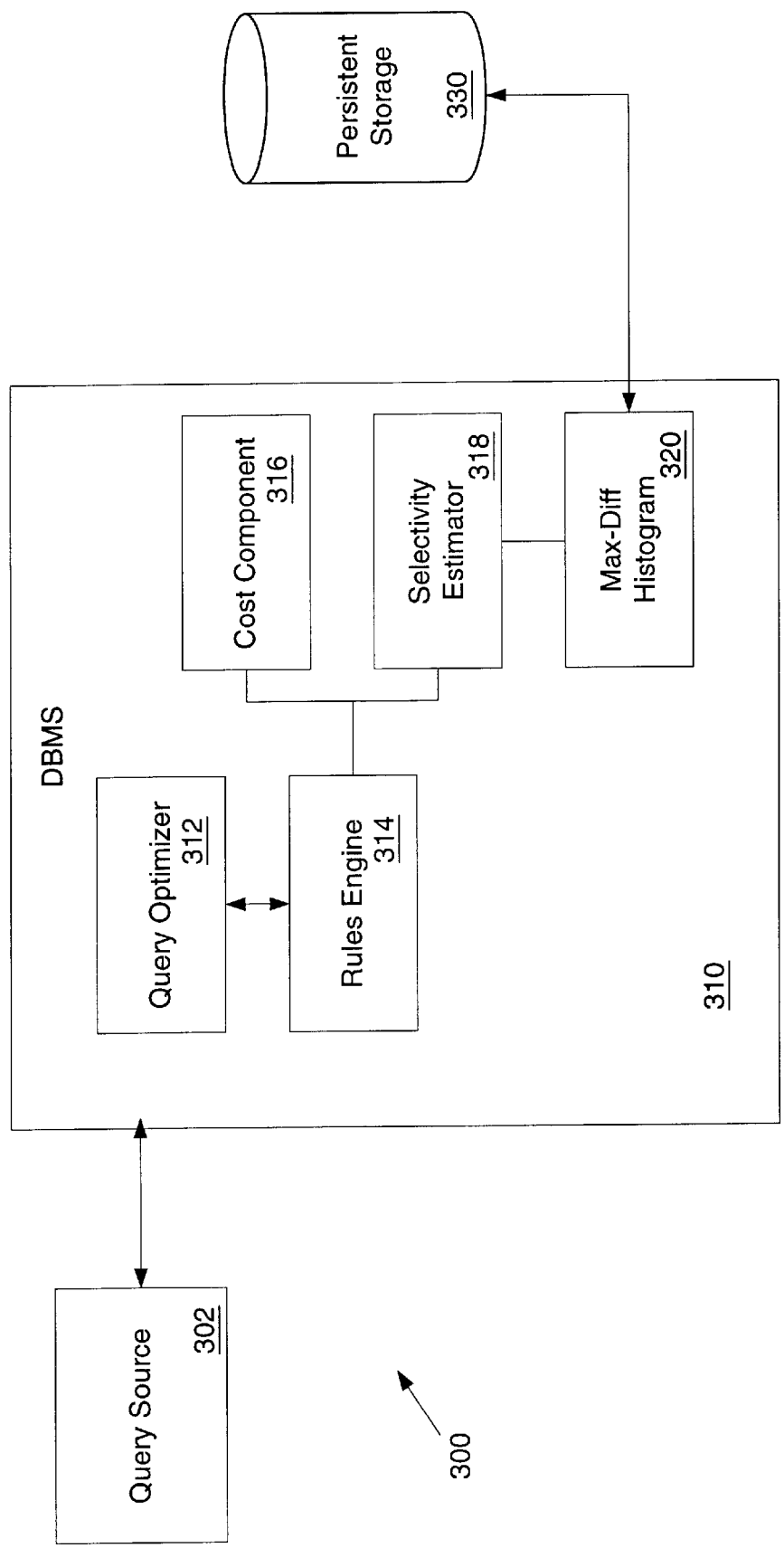
FIG. 3 is a diagram illustrating a system according to an embodiment of the invention.

A system level overview of the operation of an exemplary embodiment of the invention is described by reference to FIG. 3. The concepts of the invention are described as operating in a multiprocessing, multithreaded virtual memory operating environment on a computer, such as computer 20 in FIG. 1. The operating environment includes a query source 302, a database management system (DBMS) 310, and persistent storage 330.

Query source 302 comprises any application or software component that submits queries to DBMS 310 for resolution. Examples include application software that requires the use of a database to store and retrieve data, SQL (Structured Query Language) interface components that provide a mechanism for users to generate ad-hoc queries of the database, and report components that generate reports based on data in the database. The invention is not limited to any particular type of query source 302.

DBMS 310 receives queries from query source 302, and processes the query to return a results set back to the query source 302. DBMS 310 can include various components that cooperate to produce the results set. In some embodiments of the invention, DBMS 310 includes a query optimizer 312, a rules engine 314, a cost component 316, a selectivity estimator 318 and a maxdiff histogram storage area 320. DBMS 310 can include other components than those listed above, components that provide an enabling description of the systems and methods of the invention are described here. In one embodiment of the invention, DBMS 310 is a relational database such as Microsoft SQL Server®. In an alternative embodiment of the invention, DBMS 310 is a relational database such as Informix®, Oracle® or Sybase®. However, the invention is not limited any particular database system or database configuration.

Query optimizer 312 analyzes queries received from various query sources and operates to provide an optimal plan for retrieving data from persistent storage 330. For purposes of this specification, an optimal plan is one that provides for improved computer resource usage and/or response time than what would be achieved without the use of an optimizer. It is not necessarily the same as the "best" query plan. Query optimizer 312 communicates with rules engine 314, which is a software component that implements various rules for query optimization. The optimization rules often require cost data and selectivity estimations in order to achieve the desired result. In one embodiment of the invention, this data is supplied by cost component 316 and selectivity estimator 318.

Cost component 316 maintains costing data for accessing the persistent storage 330. Cost data can take into account the distribution of data in the database, the size of the requested data, the communication means used to communicate with the persistent storage, buffer sizes, caching etc. The invention is not limited to any particular combination of cost data.

Selectivity estimator 318 analyzes queries, particularly queries in which a join in performed, and determines how "selective" the query will be, i.e. how many rows will be returned by the query.

In order to provide accurate determninations of cost and selectivity, cost component 316 and selectivity estimator 318 require as input distribution data for the attributes involved with the query. In one embodiment of the invention, this data comprises maxdiff histograms stored in histogram storage area 320. The histograms comprise bucket data as described in reference to FIG. 2 above. In addition, other data structures are used to maintain the histogram data. For example, in one embodiment of the invention, a bucket container comprises the following data elements:

Pointer to the bucket data structure

Pointer to a bucket variance

Pointer to the next and previous bucket containers

The bucket variance comprises the following:

Variance value

Pointer to the bucket container

Bucket fill factor

Priority heap offset

Bucket variance is the deviation in density of a step's original cardEQ from the step's density after it has been coalesced with another step. In other words, variance is defined as the difference between the new step's density and the old step's cardEQ, which is a measure of "how much of a deviation is there in the old step's cardEQ with respect to the new density".

The bucket fill factor is a value that is used to eliminate wide gaps in bucket ranges in a maxdiff histogram for certain data distributions, for example, a distinct stream. Level based bucket fill factor places each bucket at a level based on the number of rows in the bucket, which is then used in comparisons of bucket variances for coalescing. On a given fill factor level, neighboring buckets with the smallest variance will be coalesced. Buckets at a lower fill factor level are considered to have smaller variance when compared to buckets at a higher fill factor level. For distinct streams, the buckets are typically evenly filled buckets, while for skewed data, the maxdiff histogram algorithm described below ensures that spikes are prominent in the data distribution represented. The bucket fill factor is also useful in cases where interpolation performs poorly applying a filter or joins when there are wide gaps in histogram buckets.

In some embodiments of the invention, histogram variances are stored in a heap which in order to provide for insertion and deletion in log(n) time, where n is the number of elements in the heap. The priority heap offset is used for a fast lookup of an element in the heap. In addition it is used in unplugging an element from the heap by locating its offset in the heap and then readjusting the heap to exclude this element.

The pointer to the bucket container is a reference to the histogram bucket for which the variance is applicable.

The histogram data, including the bucket values is determined by applying methods described below to input data received from persistent storage 330. The histogram storage area can be within persistent storage 330, or it can be within memory allocated to the DBMS 310, the invention is not limited to any particular location for histogram storage area 320.

Methods of an Exemplary Embodiment of the Invention

In the previous section, a system level overview of the operation of an exemplary embodiment of the invention was described. In this section, the particular methods of the invention performed by an operating environment executing an exemplary embodiment are described by reference to a flowchart shown in FIG. 4. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The method illustrated in FIG. 4 is inclusive of the acts required to be taken by an operating environment executing an exemplary embodiment of the invention.

Figure 4:
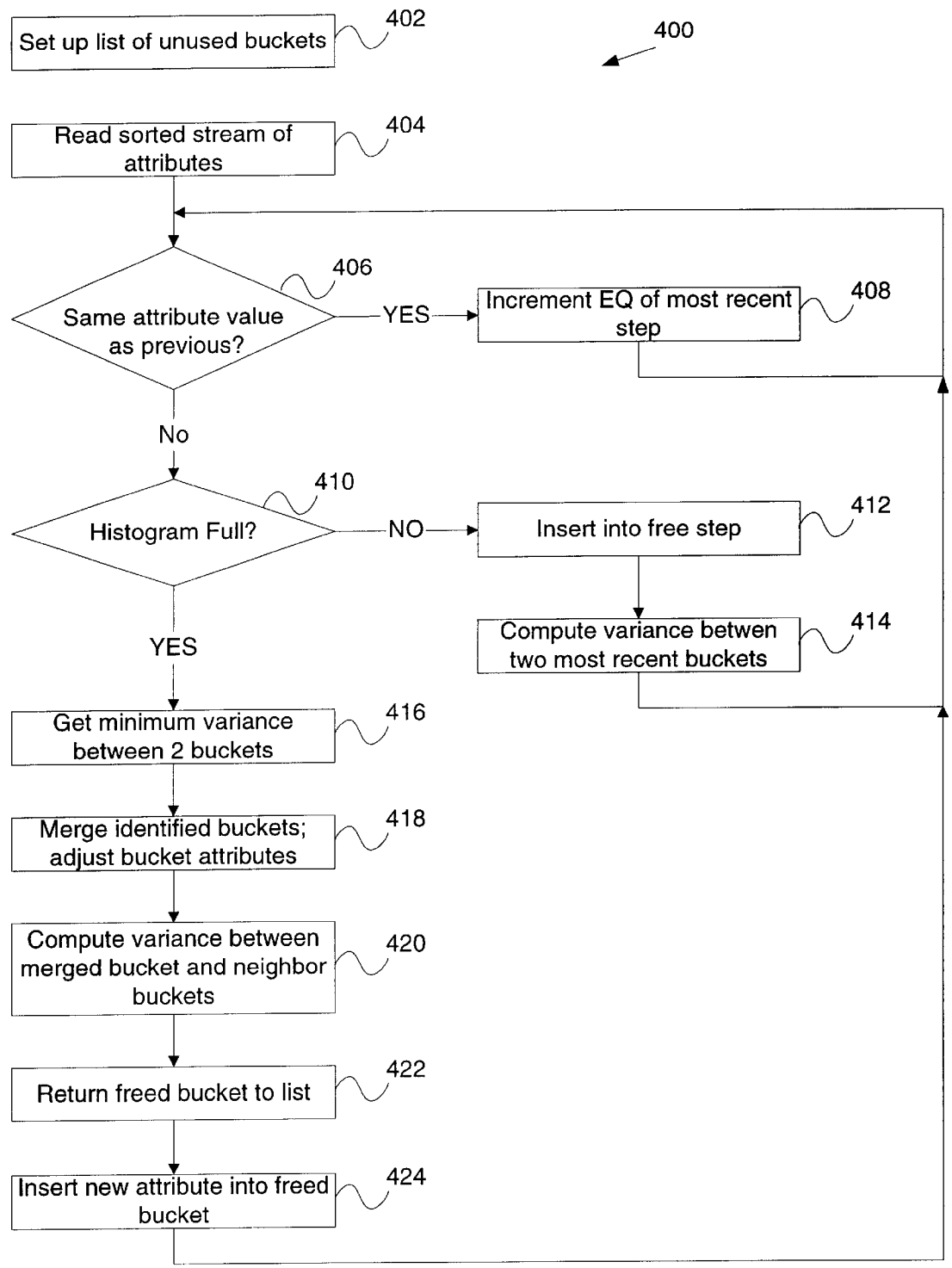
FIG. 4 is a flowchart illustrating a process for creating a maxdiff histogram according to an embodiment of the invention.

An example iterative method 400 for creating a maxdiff histogram according to an implementation of the present invention is shown in FIG. 4. The method begins when a system executing the method, such as DBMS 310, sets up and initializes list of unused buckets (block 402). The number of unused buckets set up for attributes can vary, in one embodiment of the invention, a maximum of 200 buckets is used for any one attribute histogram.

Next, the system reads a stream of values for an attribute of interest from the database (block 404). In one embodiment of the invention, the stream of attribute values is sorted. While sorting the attributes desirable, sorting is not required in order for the systems and methods to be applicable. Each of the attribute values is iteratively processed per the blocks that follow.

The system executing the method checks to determine if the most recently read attribute value is the same as the previous attribute value (block 406). If the values are the same, the system increments the cardEQ value of the current step, i.e. bucket currently being formed (block 408). The method then reads the next value from the input stream and returns to block 406.

If the values are not the same, the method next checks to determine if any buckets can be added to the histogram (block 410). If the histogram is not yet full, the method proceeds to allocate a new bucket from the unused bucket list (block 412). This new bucket is initialized with a range_Hi_Key value equal to the current attribute value read from the input stream, and a cardEQ value of one (1). Next, the system computes the variance between the two most recent buckets (block 414); Variance is calculated as a function of the deviation of its frequent value, cardEQ, with respect to the average frequency of the previous bucket and the bucket fill factor. The computation of the variance depends on the values of the cardLT attributes for the steps. If the cardLTs of the two steps coalesced were zero, then the new density is the average of the cardEQ's of the old and new step. The variance is calculated as the difference between the old cardEQ and the new average density is computed according to the following formula:

$$\text{Variance } V = \text{MAX}(cardEQ_1, cardAvgEq) - \text{MIN}(cardEQ_1, cardAvgEq)$$

where:

$$cardAvgEq = (cardEQ_1 + cardEQ_2)/2$$

If the cardLT values of either one of the two steps that were coalesced was non-zero, then the variance is the deviation in density of first step's cardEQ from the coalesced step's density. The variance and fill factor are computed according to the following formulas:

$$\text{Variance } V = \text{MAX}(cardEQ_1, LTDensity_3) - \text{MIN}(cardEQ_1, LTDensity_3)$$

$$\text{New bucket fill factor} = cardLT_3/\log_2(cardFillFactor)$$

where:

$$CardFillFactor = SampleSize/<constant>$$

<Constant>—A value that is determined based on the effectiveness of interpolation algorithm on ranges of a bucket.

In general, it is difficult to accurately determine selectivity of predicates using interpolation on a wide range of a bucket, so the goal of a "good" constant is to minimize the error in selectivity estimation. In some embodiments, the <constant> is set to a value of 512. However, the invention is not limited to a particular value for <constant>, and other values are possible and within the scope of the invention. In addition, in some embodiments, the value is configurable.

The new bucket becomes the current bucket, and the method proceeds to read the next value from the input stream and returns to block 406.

If the histogram is full, then the system proceeds to determine which of two neighboring buckets have the minimum variance (block 416). The two buckets that are identified in block 416 as having the least variance are then merged into one bucket (block 418). The merging includes adjusting the bucket attributes to reflect the combination of the two buckets. In one embodiment of the invention, the merging takes place according to the following formulas, where the subscripts "1" and "2" refer to the two neighboring buckets with the least variance, and the subscript 3 refers to the newly merged bucket:

$LTDistinct_3 = LTDistinct_1 + LTDistinct_2 + 1$ (the 1 accounts for the $cardEQ_1$ value)

$cardLT_3 = cardLT_1 + cardLT_2 + cardEQ_1$ $LTDensity_3 = cardlt_3/LTDistinct_3$ $cardEQ_3 = cardEQ_2$ Next, the variance between the newly merged bucket and its preceding and succeeding neighbor buckets is computed (block 420). The freed bucket, i.e. the leftover bucket after the two are merged into one, is returned to the list of unused buckets (block 422). This freed bucket is then allocated for use as the current bucket to contain the new attribute value (block 424). The method then reads the next value from the input stream, and returns to block 406.

As an example of the application of the above method, assume that the following data distribution for an attribute exists:

1(1), 2(2), 3(3), 4(4), 5(1), 6(1), 7(1), 8(1), 9(1), 10(19), 11(3), 12(7), 13 . . . 1000(1)

In the above example, each of the values 13 through 1000 for the attribute occurs once. Applying the method described above to the 1031 tuples yields the histogram represented in Table 1 of Appendix A.

As can be seen from the above, the present invention provides for an efficient representation for the 1043 values in 200 buckets. The data spikes in the distribution are represented as cardEQ values in individual buckets. For example., Range_Hi_Key values 4, 10 and 12 have cardEQ of 4, 19 and 7 respectively. Thus the histogram aids in answering query of various forms. For instance, a query of the form: how many rows with a column value of 10 are there in the relation? (select * from Relation R where column=10) provides an estimated cardinality of 19. Similarly a query of the form: how many rows with a column value of 3 are there in the relation? (select * from Relation R where column=3) provides an estimated cardinality of 2.5. Notice that by roundoff to the next higher integer the histogram is closer to the actual cardinalities of the tuples with a value of 3. Furthermore the effect of buckefillfactor for the rest of the distribution which is uniform is evident from the fragment of the histogram where the Range_Hi_Key>12 and Range_Hi_Key<1011. Since the density of the distribution is 1 for this range, each bucket gets approximate evenly distributed data without loosing any information about the characteristic of this region. So a query of the form: how many rows in the range 20 to 502 do we have in the relation? (select * from Relation R where column>20 and column<502) provides an estimated cardinality of 481 rows.

Furthermore, the systems and methods described above allow the user to adjust the number of buckets to achieve a balance between cost and performance that is best suited for the particular application and operating environment. Efficient use of computing resources is thus facilitated. Further, the techniques described herein can be used to quickly and efficiently determine an accurate estimated count for a particular attribute value.

Figure 5:
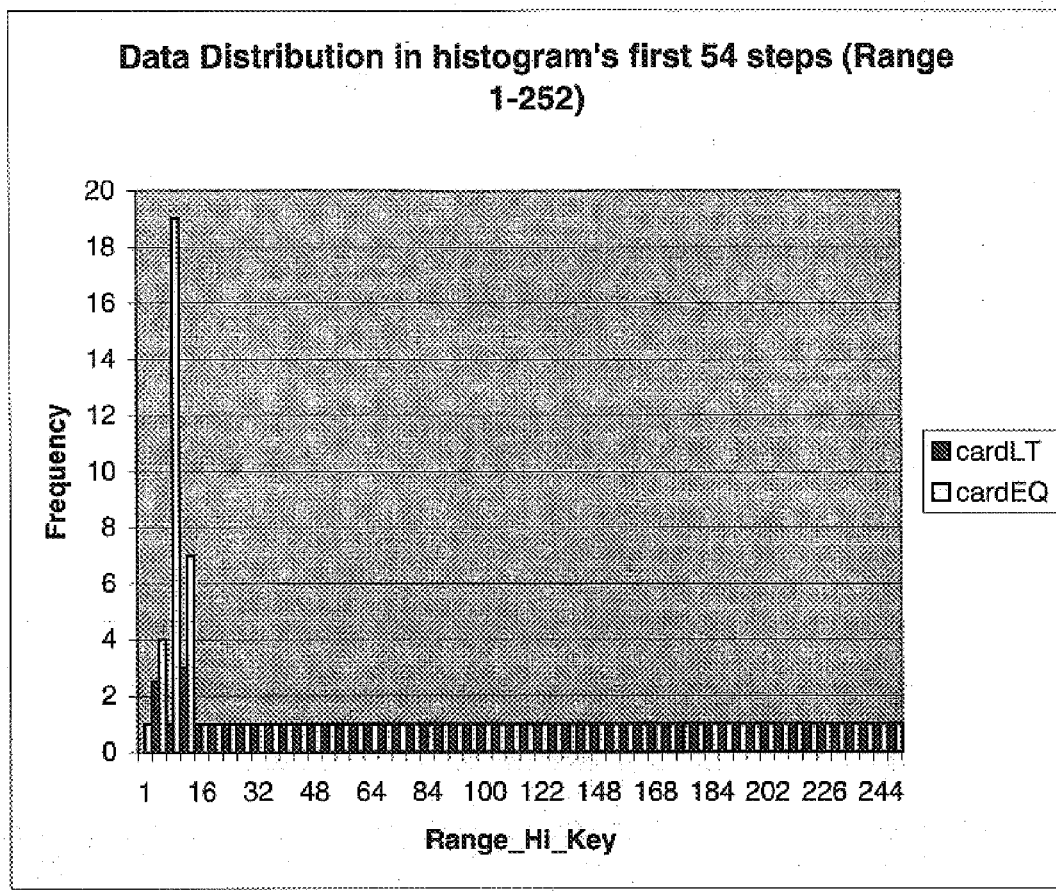
FIG. 5 is a chart illustrating the data distribution properties in an exemplary maxdiff histogram according to an embodiment of the invention.

An illustration of the for the data distribution properties of the maxdiff histogram is provided in FIG. 5. As shown in the chart of FIG. 5, the maxdiff histogram uses 54 buckets for the first 252 distinct attribute values in the exemplary data distribution.

Figure 6:
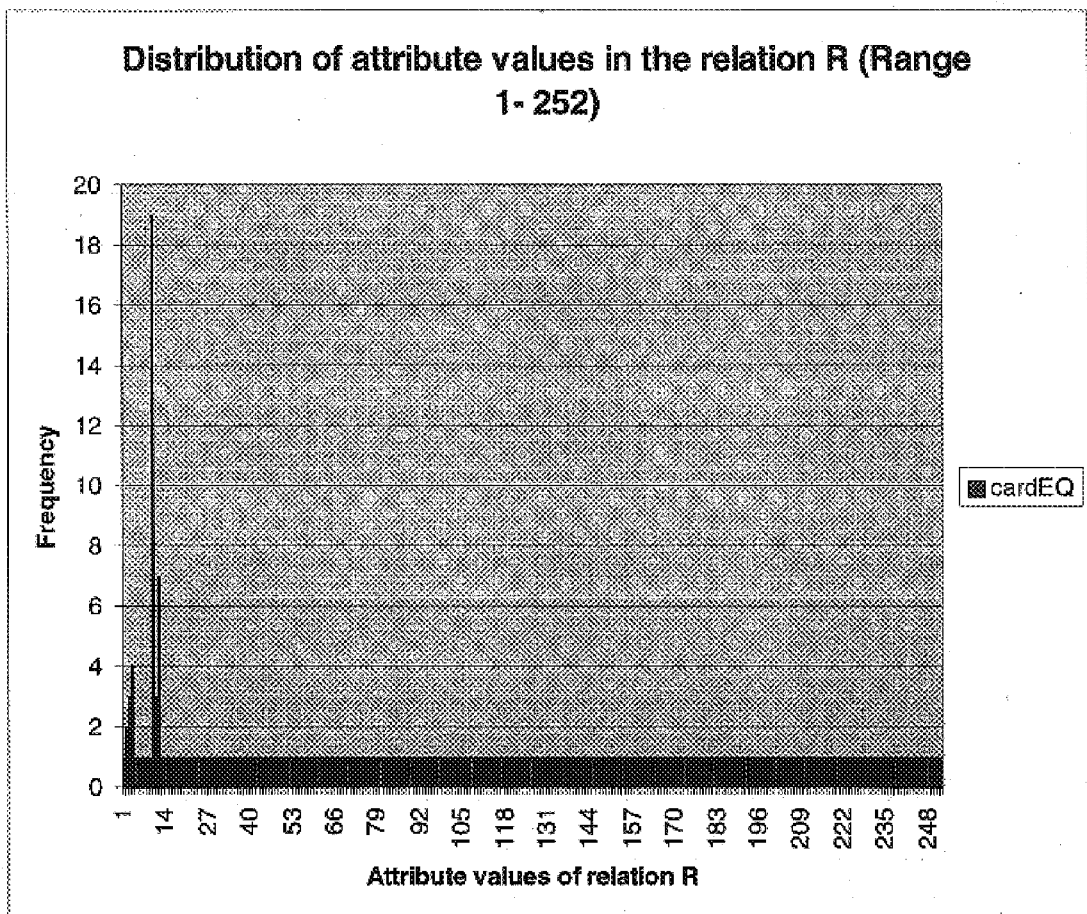
FIG. 6 is a chart illustrating the distribution of attribute values for an exemplary maxdiff histogram according to an embodiment of the invention.

FIG. 6 illustrates the data distribution of the first 252 distinct attribute values for a column in the relation.

Conclusion

Systems, methods, and data structures for creating and maintaining a maxdiff histogram have been described. The systems and methods of the invention provide advantages not found in previous systems. For example, the maxdiff histogram provides an accurate estimation of attribute value counts regardless of the distribution of values for the attribute. In addition, the histogram makes efficient use of both CPU and memory resources.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that while the systems and method have been described in the context of a DBMS system, the systems and method of the invention can be applied to other data storage systems, such as object oriented database systems. Furthermore, the systems, methods and data structures can be used in any environment in which a histogram is useful in determining a data distribution. The terminology used in this application is meant to include all of these environments. Therefore, it is manifestly intended that this invention be limited only by the following claims and equivalents thereof.

TABLE 1

| Range_Hi_Key | cardLT | cardEQ | LTDistinct | LTDensity |
|---|---|---|---|---|
| 1 | 0.0 | 1.0 | 0 | 0.0 |
| 4 | 5.0 | 4.0 | 2 | 2.5 |
| 10 | 5.0 | 19.0 | 5 | 1.0 |
| 12 | 3.0 | 7.0 | 1 | 3.0 |
| 16 | 3.0 | 1.0 | 3 | 1.0 |
| 20 | 3.0 | 1.0 | 3 | 1.0 |
| 24 | 3.0 | 1.0 | 3 | 1.0 |
| 28 | 3.0 | 1.0 | 3 | 1.0 |
| 32 | 3.0 | 1.0 | 3 | 1.0 |
| 36 | 3.0 | 1.0 | 3 | 1.0 |
| 40 | 3.0 | 1.0 | 3 | 1.0 |
| 44 | 3.0 | 1.0 | 3 | 1.0 |
| 48 | 3.0 | 1.0 | 3 | 1.0 |
| 52 | 3.0 | 1.0 | 3 | 1.0 |
| 56 | 3.0 | 1.0 | 3 | 1.0 |
| 60 | 3.0 | 1.0 | 3 | 1.0 |
| 64 | 3.0 | 1.0 | 3 | 1.0 |
| 68 | 3.0 | 1.0 | 3 | 1.0 |
| 76 | 7.0 | 1.0 | 7 | 1.0 |
| 80 | 3.0 | 1.0 | 3 | 1.0 |
| 84 | 3.0 | 1.0 | 3 | 1.0 |
| 88 | 3.0 | 1.0 | 3 | 1.0 |
| 92 | 3.0 | 1.0 | 3 | 1.0 |
| 96 | 3.0 | 1.0 | 3 | 1.0 |
| 100 | 3.0 | 1.0 | 3 | 1.0 |
| 106 | 5.0 | 1.0 | 5 | 1.0 |
| 112 | 5.0 | 1.0 | 5 | 1.0 |
| 116 | 3.0 | 1.0 | 3 | 1.0 |
| 122 | 5.0 | 1.0 | 5 | 1.0 |
| 128 | 5.0 | 1.0 | 5 | 1.0 |
| 136 | 7.0 | 1.0 | 7 | 1.0 |
| 140 | 3.0 | 1.0 | 3 | 1.0 |
| 148 | 7.0 | 1.0 | 7 | 1.0 |
| 154 | 5.0 | 1.0 | 5 | 1.0 |
| 160 | 5.0 | 1.0 | 5 | 1.0 |
| 164 | 3.0 | 1.0 | 3 | 1.0 |
| 168 | 3.0 | 1.0 | 3 | 1.0 |
| 172 | 3.0 | 1.0 | 3 | 1.0 |
| 176 | 3.0 | 1.0 | 3 | 1.0 |
| 180 | 3.0 | 1.0 | 3 | 1.0 |
| 184 | 3.0 | 1.0 | 3 | 1.0 |
| 188 | 3.0 | 1.0 | 3 | 1.0 |
| 194 | 5.0 | 1.0 | 5 | 1.0 |
| 198 | 3.0 | 1.0 | 3 | 1.0 |
| 202 | 3.0 | 1.0 | 3 | 1.0 |
| 210 | 7.0 | 1.0 | 7 | 1.0 |
| 214 | 3.0 | 1.0 | 3 | 1.0 |
| 222 | 7.0 | 1.0 | 7 | 1.0 |

TABLE 1-continued

| Range_Hi_Key | cardLT | cardEQ | LTDistinct | LTDensity |
|---|---|---|---|---|
| 226 | 3.0 | 1.0 | 3 | 1.0 |
| 230 | 3.0 | 1.0 | 3 | 1.0 |
| 234 | 3.0 | 1.0 | 3 | 1.0 |
| 238 | 3.0 | 1.0 | 3 | 1.0 |
| 244 | 5.0 | 1.0 | 5 | 1.0 |
| 252 | 7.0 | 1.0 | 7 | 1.0 |
| 256 | 3.0 | 1.0 | 3 | 1.0 |
| 260 | 3.0 | 1.0 | 3 | 1.0 |
| 264 | 3.0 | 1.0 | 3 | 1.0 |
| 270 | 5.0 | 1.0 | 5 | 1.0 |
| 278 | 7.0 | 1.0 | 7 | 1.0 |
| 282 | 3.0 | 1.0 | 3 | 1.0 |
| 286 | 3.0 | 1.0 | 3 | 1.0 |
| 290 | 3.0 | 1.0 | 3 | 1.0 |
| 294 | 3.0 | 1.0 | 3 | 1.0 |
| 298 | 3.0 | 1.0 | 3 | 1.0 |
| 304 | 5.0 | 1.0 | 5 | 1.0 |
| 308 | 3.0 | 1.0 | 3 | 1.0 |
| 312 | 3.0 | 1.0 | 3 | 1.0 |
| 318 | 5.0 | 1.0 | 5 | 1.0 |
| 324 | 5.0 | 1.0 | 5 | 1.0 |
| 328 | 3.0 | 1.0 | 3 | 1.0 |
| 336 | 7.0 | 1.0 | 7 | 1.0 |
| 340 | 3.0 | 1.0 | 3 | 1.0 |
| 346 | 5.0 | 1.0 | 5 | 1.0 |
| 350 | 3.0 | 1.0 | 3 | 1.0 |
| 354 | 3.0 | 1.0 | 3 | 1.0 |
| 358 | 3.0 | 1.0 | 3 | 1.0 |
| 362 | 3.0 | 1.0 | 3 | 1.0 |
| 366 | 3.0 | 1.0 | 3 | 1.0 |
| 370 | 3.0 | 1.0 | 3 | 1.0 |
| 374 | 3.0 | 1.0 | 3 | 1.0 |
| 380 | 5.0 | 1.0 | 5 | 1.0 |
| 386 | 5.0 | 1.0 | 5 | 1.0 |
| 390 | 3.0 | 1.0 | 3 | 1.0 |
| 394 | 3.0 | 1.0 | 3 | 1.0 |
| 402 | 7.0 | 1.0 | 7 | 1.0 |
| 406 | 3.0 | 1.0 | 3 | 1.0 |
| 410 | 3.0 | 1.0 | 3 | 1.0 |
| 418 | 7.0 | 1.0 | 7 | 1.0 |
| 422 | 3.0 | 1.0 | 3 | 1.0 |
| 430 | 7.0 | 1.0 | 7 | 1.0 |
| 438 | 7.0 | 1.0 | 7 | 1.0 |
| 442 | 3.0 | 1.0 | 3 | 1.0 |
| 450 | 7.0 | 1.0 | 7 | 1.0 |
| 454 | 3.0 | 1.0 | 3 | 1.0 |
| 462 | 7.0 | 1.0 | 7 | 1.0 |
| 470 | 7.0 | 1.0 | 7 | 1.0 |
| 478 | 7.0 | 1.0 | 7 | 1.0 |
| 482 | 3.0 | 1.0 | 3 | 1.0 |
| 486 | 3.0 | 1.0 | 3 | 1.0 |
| 490 | 3.0 | 1.0 | 3 | 1.0 |
| 494 | 3.0 | 1.0 | 3 | 1.0 |
| 498 | 3.0 | 1.0 | 3 | 1.0 |
| 502 | 3.0 | 1.0 | 3 | 1.0 |
| 510 | 7.0 | 1.0 | 7 | 1.0 |
| 514 | 3.0 | 1.0 | 3 | 1.0 |
| 518 | 3.0 | 1.0 | 3 | 1.0 |
| 522 | 3.0 | 1.0 | 3 | 1.0 |
| 526 | 3.0 | 1.0 | 3 | 1.0 |
| 530 | 3.0 | 1.0 | 3 | 1.0 |
| 534 | 3.0 | 1.0 | 3 | 1.0 |
| 538 | 3.0 | 1.0 | 3 | 1.0 |
| 542 | 3.0 | 1.0 | 3 | 1.0 |
| 546 | 3.0 | 1.0 | 3 | 1.0 |
| 550 | 3.0 | 1.0 | 3 | 1.0 |
| 554 | 3.0 | 1.0 | 3 | 1.0 |
| 558 | 3.0 | 1.0 | 3 | 1.0 |
| 562 | 3.0 | 1.0 | 3 | 1.0 |
| 566 | 3.0 | 1.0 | 3 | 1.0 |
| 570 | 3.0 | 1.0 | 3 | 1.0 |
| 574 | 3.0 | 1.0 | 3 | 1.0 |
| 578 | 3.0 | 1.0 | 3 | 1.0 |
| 582 | 3.0 | 1.0 | 3 | 1.0 |
| 586 | 3.0 | 1.0 | 3 | 1.0 |
| 590 | 3.0 | 1.0 | 3 | 1.0 |
| 594 | 3.0 | 1.0 | 3 | 1.0 |

TABLE 1-continued

| Range_Hi_Key | cardLT | cardEQ | LTDistinct | LTDensity |
|---|---|---|---|---|
| 598 | 3.0 | 1.0 | 3 | 1.0 |
| 602 | 3.0 | 1.0 | 3 | 1.0 |
| 606 | 3.0 | 1.0 | 3 | 1.0 |
| 610 | 3.0 | 1.0 | 3 | 1.0 |
| 614 | 3.0 | 1.0 | 3 | 1.0 |
| 618 | 3.0 | 1.0 | 3 | 1.0 |
| 622 | 3.0 | 1.0 | 3 | 1.0 |
| 630 | 7.0 | 1.0 | 7 | 1.0 |
| 634 | 3.0 | 1.0 | 3 | 1.0 |
| 638 | 3.0 | 1.0 | 3 | 1.0 |
| 642 | 3.0 | 1.0 | 3 | 1.0 |
| 646 | 3.0 | 1.0 | 3 | 1.0 |
| 654 | 7.0 | 1.0 | 7 | 1.0 |
| 658 | 3.0 | 1.0 | 3 | 1.0 |
| 662 | 3.0 | 1.0 | 3 | 1.0 |
| 666 | 3.0 | 1.0 | 3 | 1.0 |
| 670 | 3.0 | 1.0 | 3 | 1.0 |
| 674 | 3.0 | 1.0 | 3 | 1.0 |
| 678 | 3.0 | 1.0 | 3 | 1.0 |
| 682 | 3.0 | 1.0 | 3 | 1.0 |
| 686 | 3.0 | 1.0 | 3 | 1.0 |
| 694 | 7.0 | 1.0 | 7 | 1.0 |
| 698 | 3.0 | 1.0 | 3 | 1.0 |
| 702 | 3.0 | 1.0 | 3 | 1.0 |
| 706 | 3.0 | 1.0 | 3 | 1.0 |
| 710 | 3.0 | 1.0 | 3 | 1.0 |
| 714 | 3.0 | 1.0 | 3 | 1.0 |
| 718 | 3.0 | 1.0 | 3 | 1.0 |
| 722 | 3.0 | 1.0 | 3 | 1.0 |
| 726 | 3.0 | 1.0 | 3 | 1.0 |
| 730 | 3.0 | 1.0 | 3 | 1.0 |
| 734 | 3.0 | 1.0 | 3 | 1.0 |
| 738 | 3.0 | 1.0 | 3 | 1.0 |
| 742 | 3.0 | 1.0 | 3 | 1.0 |
| 746 | 3.0 | 1.0 | 3 | 1.0 |
| 750 | 3.0 | 1.0 | 3 | 1.0 |
| 754 | 3.0 | 1.0 | 3 | 1.0 |
| 758 | 3.0 | 1.0 | 3 | 1.0 |
| 764 | 5.0 | 1.0 | 5 | 1.0 |
| 770 | 5.0 | 1.0 | 5 | 1.0 |
| 776 | 5.0 | 1.0 | 5 | 1.0 |
| 782 | 5.0 | 1.0 | 5 | 1.0 |
| 788 | 5.0 | 1.0 | 5 | 1.0 |
| 794 | 5.0 | 1.0 | 5 | 1.0 |
| 800 | 5.0 | 1.0 | 5 | 1.0 |
| 806 | 5.0 | 1.0 | 5 | 1.0 |
| 812 | 5.0 | 1.0 | 5 | 1.0 |
| 818 | 5.0 | 1.0 | 5 | 1.0 |
| 824 | 5.0 | 1.0 | 5 | 1.0 |
| 830 | 5.0 | 1.0 | 5 | 1.0 |
| 836 | 5.0 | 1.0 | 5 | 1.0 |
| 842 | 5.0 | 1.0 | 5 | 1.0 |
| 848 | 5.0 | 1.0 | 5 | 1.0 |
| 854 | 5.0 | 1.0 | 5 | 1.0 |
| 860 | 5.0 | 1.0 | 5 | 1.0 |
| 868 | 7.0 | 1.0 | 7 | 1.0 |
| 876 | 7.0 | 1.0 | 7 | 1.0 |
| 884 | 7.0 | 1.0 | 7 | 1.0 |
| 892 | 7.0 | 1.0 | 7 | 1.0 |
| 900 | 7.0 | 1.0 | 7 | 1.0 |
| 908 | 7.0 | 1.0 | 7 | 1.0 |
| 916 | 7.0 | 1.0 | 7 | 1.0 |
| 924 | 7.0 | 1.0 | 7 | 1.0 |
| 932 | 7.0 | 1.0 | 7 | 1.0 |
| 940 | 7.0 | 1.0 | 7 | 1.0 |
| 948 | 7.0 | 1.0 | 7 | 1.0 |
| 956 | 7.0 | 1.0 | 7 | 1.0 |
| 964 | 7.0 | 1.0 | 7 | 1.0 |
| 972 | 7.0 | 1.0 | 7 | 1.0 |
| 980 | 7.0 | 1.0 | 7 | 1.0 |
| 988 | 7.0 | 1.0 | 7 | 1.0 |
| 996 | 7.0 | 1.0 | 7 | 1.0 |
| 1004 | 7.0 | 1.0 | 7 | 1.0 |
| 1010 | 5.0 | 1.0 | 5 | 1.0 |
| 1011 | 0.0 | 1.0 | 0 | 0.0 |

We claim:

1. A method for creating a histogram, the histogram comprising a plurality of buckets, the method comprising:

reading a set of attribute values;

for each current value in the set of values, performing the acts of:

determining if a bucket is available;

if a bucket is available, then initializing a cardEQ value and a range_Hi_Key value for the bucket;

otherwise performing the acts of:

merging a first previously used bucket with a second previously used bucket into the first previously used bucket, wherein the first and second buckets are neighboring buckets; and initializing the second previously used bucket to represent the current value; and recalculating the variance between the plurality of buckets.

2. The method of claim 1, wherein merging the first and second previously used buckets selects the first and second previously used buckets with the least variance.

3. The method of claim 2, wherein the variance is determined according to the deviation of the cardEQ value for the second previously used bucket, and an LTDensity value for the first previously used bucket.

4. The method of claim 3, wherein the variance (V) is determined according to the formula:

$$V = \text{MAX}(\text{cardEQ}_1, \text{cardAvgEQ}) - \text{MIN}(\text{cardEQ}_1, \text{cardAvgEQ}).$$

5. The method of claim 1, wherein merging a first previously used bucket with a second previously used bucket merges the cardEQ fields, the LTDistinct fields and the LTDensity fields of the first and second previously used buckets.

6. The method of claim 5, wherein the merging is performed according to the formula:

$$\text{LTDistinct}_{merged} = \text{LTDistinct}_1 + \text{LTDistinct}_2 + 1;$$

$$\text{cardLT}_{merged} = \text{cardLT}_1 + \text{cardLT}_2 + \text{cardEQ}_1;$$

$$\text{LTDensity}_{merged} = \text{cardlt}_{merged} / \text{LTDistinct}_{merged}.$$

7. The method of claim 1, wherein the set of attribute values is sorted.

8. A computer-readable medium having disposed thereon a bucket data structure comprising:

a range_Hi_Key field comprising a value indicating the upper bound for a set of values represented by the bucket;

a cardEQ field representing a count of the number of attribute values for the range_Hi_Key field;

a cardLT field representing a count of a number of attribute values represented by the bucket that are less than the range_Hi_Key field and greater than a lower bound for the bucket;

an LTDistinct field representing a number of distinct values represented by the bucket; and an LTDensity field representing the average count for the number of attribute values represented by the bucket that are less than the range_Hi_Key field and greater than a lower bound for the bucket.

9. The computer-readable medium of claim 8, further comprising a range_Lo field indicating the lower bound for a set of values represented by the bucket.

10. A computerized database management system comprising:
- a database manager operative to create and maintain a maxdiff histogram;
- a cost component operative to analyze a query received from a query source and further operative to read the maxdiff histogram to determine a cost for the query.

11. A computer-readable medium having computer-executable instructions for performing a method for creating a histogram, the method comprising:
- reading a set of attribute values;
- for each current value in the set of values, performing the acts of:
  - determining if a bucket is available;
  - if a bucket is available, then initializing a cardEQ value and a range__Hi__Key value for the bucket;
  - otherwise performing the acts of:
    - merging a first previously used bucket with a second previously used bucket into the first previously used bucket, wherein the first and second buckets are neighboring buckets; and
    - initializing the second previously used bucket to represent the current value; and
  - recalculating the variance between the plurality of buckets.

12. The computer-readable medium of claim 11, wherein merging the first and second previously used buckets selects the first and second previously used buckets with the least variance.

13. The computer-readable medium of claim 12, wherein the variance is determined according to the deviation of the cardEQ value for the second previously used bucket, an LTDensity value for the first previously used bucket.

14. The computer-readable medium of claim 13, wherein the variance is determined according to the formula:

$$V=\text{MAX}(\text{cardEQ}_1, \text{cardAvgEQ})-\text{MIN}(\text{cardEQ}_1, \text{cardAvgEQ}).$$

15. The computer-readable medium of claim 11, wherein merging a first previously used bucket with a second previously used bucket merges the cardEQ fields, the LTDistinct fields and the LTDensity fields of the first and second previously used buckets.

16. The computer-readable medium of claim 15, wherein the merging is performed according to the formula:

$$\text{LTDistinct}_{merged}=\text{LTDistinct}_1+\text{LTDistinct}_2+1;$$

$$\text{cardLT}_{merged}=\text{cardLT}_1+\text{cardLT}_2+\text{cardEQ}_1; \text{ and}$$

$$\text{LTDensity}_{merged}=\text{cardlt}_{merged}/\text{LTDistinct}_{merged}.$$

17. The computer-readable medium of claim 11, wherein the set of attributes is sorted.

* * * * *